United States Patent
Takamatsu et al.

(12)

(10) Patent No.: US 9,227,635 B1
(45) Date of Patent: Jan. 5, 2016

(54) METHOD AND SYSTEM OF ASSISTING A DRIVER OF A VEHICLE

(71) Applicants: Nissan North America, Inc., Franklin, TN (US); NISSAN MOTOR CO., LTD., Yokohama-shi, Kanagawa (JP)

(72) Inventors: Yoshiro Takamatsu, Sunnyvale, CA (US); Yuji Takada, Sunnyvale, CA (US); Yoshinori Kusayanagi, Kamakura (JP); Norimasa Kishi, Yokohama (JP)

(73) Assignees: NISSAN NORTH AMERICA, INC., Franklin, TN (US); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/497,069

(22) Filed: Sep. 25, 2014

(51) Int. Cl.
| | |
|---|---|
| *B62D 6/00* | (2006.01) |
| *B60W 30/12* | (2006.01) |
| *B62D 5/04* | (2006.01) |
| *B62D 15/02* | (2006.01) |

(52) U.S. Cl.
CPC ............. *B60W 30/12* (2013.01); *B62D 5/0433* (2013.01); *B62D 5/0466* (2013.01); *B62D 15/025* (2013.01)

(58) Field of Classification Search
USPC .......... 318/466–467; 701/300, 25–26, 41–42, 701/538; 345/173; 382/199; 340/465; 348/119; 180/443
See application file for complete search history.

(56) References Cited

U.S. PATENT DOCUMENTS

| | | | | |
|---|---|---|---|---|
| 6,823,241 | B2 * | 11/2004 | Shirato | G06K 9/4609 701/1 |
| 7,894,956 | B2 * | 2/2011 | Kondo et al. | 701/41 |
| 8,050,824 | B2 * | 11/2011 | Tamaizumi | B62D 5/0463 180/443 |
| 8,781,682 | B2 * | 7/2014 | Suzuki | B62D 5/0463 701/41 |
| 9,008,914 | B2 * | 4/2015 | Akiyama | 701/41 |
| 2002/0013647 | A1 * | 1/2002 | Kawazoe et al. | 701/41 |
| 2002/0042668 | A1 * | 4/2002 | Shirato | G06K 9/4609 701/1 |
| 2004/0262063 | A1 * | 12/2004 | Kaufmann et al. | 180/169 |
| 2005/0174257 | A1 * | 8/2005 | Shankwitz et al. | 340/909 |
| 2006/0047390 | A1 * | 3/2006 | Scherl | B62D 15/025 701/41 |

(Continued)

FOREIGN PATENT DOCUMENTS

| | | | | |
|---|---|---|---|---|
| DE | 102013000199 | * | 7/2014 | ............ B62D 6/002 |
| EP | 1862374 A8 | * | 2/2008 | |

(Continued)

OTHER PUBLICATIONS

Haptic-enabled driving training system; Osgouei, R.H. ; Hojin Lee ; Seungmoon Choi; RO-MAN, 2013 IEEE; DOI: 10.1109/ROMAN. 2013.6628494; Publication Year: 2013 , pp. 302-303.*

(Continued)

*Primary Examiner* — Cuong H Nguyen
(74) *Attorney, Agent, or Firm* — Global IP Counselors, LLP

(57) ABSTRACT

A method of assisting a driver of a vehicle. A road to be driven by the driver is identified using a position determination unit. A parameter is selected to assist a driver of the vehicle in driving a segment of the road. The parameter includes information on the location of a boundary along the road and a preferred trajectory to be driven along the road. A controller determines whether a current trajectory of the vehicle while travelling the road is deviating from the preferred trajectory of the vehicle along the road. A feedback operation is provided to assist the driver in guiding the vehicle nearer to the preferred trajectory based on the selected parameter.

20 Claims, 10 Drawing Sheets

(56) References Cited

U.S. PATENT DOCUMENTS

| | | | |
|---|---|---|---|
| 2008/0189012 A1* | 8/2008 | Kaufmann | 701/41 |
| 2009/0048738 A1* | 2/2009 | Iwazaki et al. | 701/44 |
| 2009/0112405 A1* | 4/2009 | Tamaizumi | B62D 5/0466 701/42 |
| 2009/0222170 A1* | 9/2009 | Scherl et al. | 701/44 |
| 2009/0299573 A1* | 12/2009 | Thrun et al. | 701/41 |
| 2010/0002911 A1* | 1/2010 | Wu et al. | 382/104 |
| 2010/0191421 A1* | 7/2010 | Nilsson | 701/41 |
| 2012/0197496 A1* | 8/2012 | Limpibunterng | B62D 1/286 701/42 |
| 2013/0032421 A1 | 2/2013 | Bonne et al. | |
| 2013/0035821 A1 | 2/2013 | Bonne et al. | |
| 2013/0144491 A1* | 6/2013 | Kim | 701/42 |
| 2013/0231830 A1 | 9/2013 | Van Dan Elzen et al. | |
| 2014/0039716 A1* | 2/2014 | Buerkle et al. | 701/1 |
| 2015/0185036 A1* | 7/2015 | Braeuchle | G08G 1/0112 701/538 |

FOREIGN PATENT DOCUMENTS

| | | | | |
|---|---|---|---|---|
| JP | 2000-033860 A | | 2/2000 | |
| JP | 2006151122 A | * | 6/2006 | |
| WO | WO 2006/101005 | * | 9/2006 | |
| WO | WO 2012129418 A3 | * | 12/2012 | B60W 30/146 |
| WO | WO 2012129424 A3 | * | 2/2013 | B60W 50/0097 |
| WO | WO 2013/046301 | * | 4/2013 | |

OTHER PUBLICATIONS

Model-based threat assessment for lane guidance systems; Ali, M.; Falcone, P.; Sjoberg, J.; American Control Conference (ACC), 2011; DOI: 10.1109/ACC.2011.5991088; Publication Year: 2011, pp. 4586-4591.*

3-DOF haptic feedback of assisted driving of an omnidirectional wheelchair; Christensen, Quinton; Mascaro, S.; Intelligent Robots and Systems (IROS), 2011 IEEE/RSJ International Conference on; DOI: 10.1109/IROS.2011.6095062; Publication Year: 2011, pp. 2596-2601.*

Estimation of lane data-based features by odometric vehicle data for driver state monitoring; Friedrichs, F.; Miksch, M.; Bin Yang Intelligent Transportation Systems (ITSC), 2010 13th International IEEE Conference on; DOI: 10.1109/ITSC.2010.5624976 Publication Year: 2010, pp. 611-616.*

Reducing congestion at uphill freeway sections by means of a Gradient Compensation System; Goni Ros, B.; Knoop, V.L.; van Arem, B.; Hoogendoorn, S.P.; Intelligent Vehicles Symposium (IV), 2012 IEEE; Year: 2012; pp. 191-198, DOI: 10.1109/IVS.2012.6232150.*

The effect of haptic guidance on curve negotiation behavior of young, experienced drivers; Mulder, M.; Abbink, D.A.; Boer, E.R. Systems, Man and Cybernetics, 2008. SMC 2008. IEEE International Conference on; Year: 2008; pp. 804-809, DOI: 10.1109/ICSMC.2008.4811377.*

Evaluation of a customizable haptic feedback system for ground vehicle steer-by-wire interfaces; Mandhata, U.B.; Jensen, M.J.; Wagner, J.R.; Switzer, F.S.; Dawson, D.M.; Summers, J.D.; American Control Conference (ACC), 2012; Year: 2012 pp. 2781-2787, DOI: 10.1109/ACC.2012.6314906.*

Road-Departure Prevention in an Emergency Obstacle Avoidance Situation; Katzourakis, D.I.; de Winter, J.C.F.; Alirezaei, M.; Corno, M.; Happee, R.; Systems, Man, and Cybernetics: Systems, IEEE Transactions on; Year: 2014, vol. 44, Issue: 5 pp. 621-629, DOI: 10.1109/TSMC.2013.2263129.*

Design, Analysis, and Validation of a Haptic-Based Driver Support System for Traction Control; Corno, M.; Intelligent Transportation Systems, IEEE Transactions on; Year: 2013, vol. 14, Issue: 4; pp. 1849-859, DOI: 10.1109/TITS.2013.2268316.*

Dynamic matrix and model predictive control for a semi-auto pilot car; Shroff, D.; Nangalia, H.; Metawala, A.; Parulekar, M.; Padte, V.; Advances in Technology and Engineering (ICATE), 2013 International Conference on; Year: 2013.*

Sharing trajectories of autonomous driving vehicles to achieve time-efficient path navigation; Pei-Jin He; Kuo-Feng Ssu; Yu-Yuan Lin; Vehicular Networking Conference (VNC), 2013 IEEE; Year: 2013; pp. 119-126, DOI: 10.1109/VNC.2013.6737598.*

* cited by examiner

METHOD AND SYSTEM OF ASSISTING A DRIVER OF A VEHICLE

BACKGROUND

1. Field of the Invention

The present invention generally relates to a method and system of assisting a driver of a vehicle. More specifically, the present invention relates to a method and system disposed in a vehicle that provides a feedback operation to assist a driver in guiding the vehicle nearer to a preferred trajectory based on a selected parameter map.

2. Background Information

Conventional technology exists that assists a driver of vehicle in recognizing the environment surrounding a vehicle. In one such system, the lane departure tendency of the vehicle is detected based on a lane dividing line or lane border and a future position of the vehicle after a predetermined time period is calculated. When the system determines that lane departure is imminent, the system controls the vehicle to move in such a direction that lane departure is prevented as disclosed in, for example, Japanese Patent Unexamined Publication No. 2000-33860.

SUMMARY

It has been discovered that in driver assistance systems providing feedback to the driver of the vehicle based on the location of the vehicle along a road, features of the road and parameters is desirable. For example, when traveling on a road (e.g., a narrow road or a busy multilane road), a driver may be uncomfortable with the distance between the vehicle and the road boundary, as well as the position of the vehicle within the road. In such situations, each individual driver may desire a preferred trajectory along the road.

In view of the state of the known technology, one aspect of the present disclosure is to provide feedback to the driver based on a preferred trajectory and a driver's individual skill and preference, and other desired parameters or factors. In one disclosed embodiment, a method of assisting a driver of a vehicle includes identifying a road to be driven by the driver using a position determination unit. A parameter is selected to assist a driver of the vehicle in driving a segment of the road. The parameter includes information on the location of a boundary along the road and a preferred trajectory to be driven along the road. A controller determines whether a current trajectory of the vehicle while travelling the road is deviating from the preferred trajectory of the vehicle along the road. A feedback operation is provided to assist the driver in guiding the vehicle nearer to the preferred trajectory based on the selected parameter map.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

The disclosed exemplary embodiments are for a driver assistance system 12 that applies a feedback operation to a host vehicle 10 when traveling along a road 26. It is noted that driver assistance system 12 may be used in a non-autonomous vehicle, or an autonomous vehicle, as desired. The controller 14 of the driver assistance system 12 can adjust the timing and the amount and type of a feedback operation to improve driver comfort.

Figure 1:
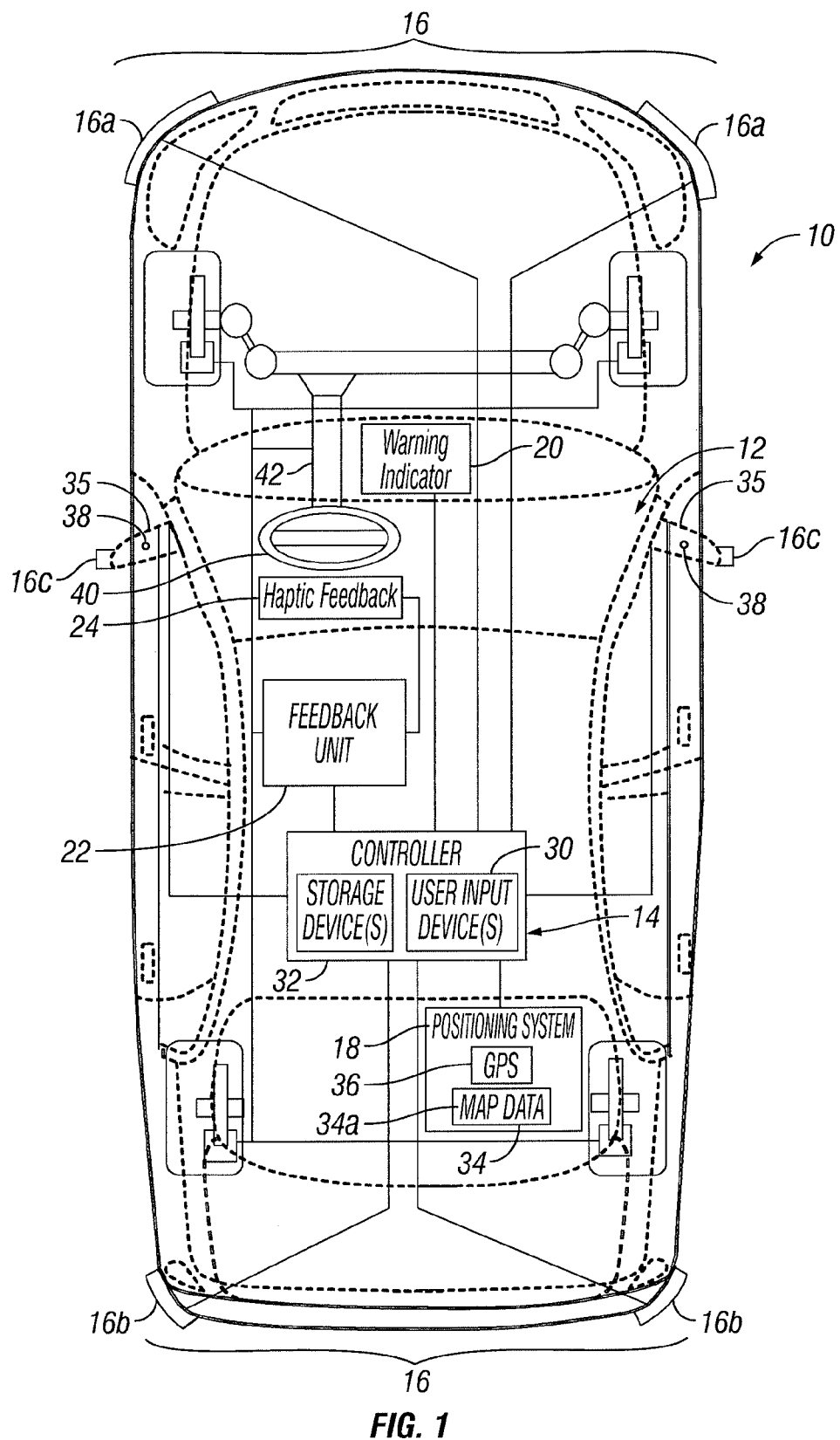
FIG. 1 is a schematic top view of an vehicle having a driver assistance system in accordance with an exemplary embodiment of the present invention.

Referring initially to FIG. 1, a driver assistance system 12 for a host vehicle 10 is illustrated in accordance with an exemplary embodiment. The driver assistance system 12 includes a controller 14, a sensor system 16, a positioning system 18, a warning indicator 20 or system, a feedback unit 22 and a haptic feedback 24.

The controller 14 preferably includes a microcomputer with a control program that controls the driver assistance system 12 as discussed below. The controller 14 can also include other conventional components such as an input interface circuit, an output interface circuit, and storage device(s) 32, such as a ROM (Read Only Memory) device and a RAM (Random Access Memory) device. The microcomputer of the controller 14 is programmed to control one or more of the sensor system 16, the positioning system 18, the warning indicator 20 or system, the feedback unit 22 and the haptic feedback 24, and to make determinations or decisions, as discussed herein. The memory circuit stores processing results and control programs, such as ones for the sensor system 16, the positioning system 18, the warning indicator 20 or system, the feedback unit 22 and the haptic feedback 24 operation that are run by the processor circuit. The controller 14 is operatively coupled to the sensor system 16, the positioning system 18, the warning indicator 20 or system, the feedback unit 22 and the haptic feedback 24 in a conventional manner, as well as other electrical systems in the vehicle 10, such as the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the detection system in accordance with the control program. It will be apparent to those skilled in the art from this disclosure that the precise structure and algorithms for the controller 14 can be any combination of hardware and software that will carry out the functions of the present invention.

As shown in FIG. 1, the controller 14 can include or be in communication with user input devices 30. The user input devices 30 can include, for example, a human-machine interface (HMI) that enables a user (e.g., the driver and/or passenger) to interact with the driver assistance system 12 as understood in the art and discussed herein. The controller 14 can further include or be in communication with one or more storage device(s) 32, which can store information as discussed herein.

In an exemplary embodiment, the sensor system 16 can include proximity sensors and optical sensors. In an exemplary embodiment, the proximity sensors include a plurality of sensors, and are configured to detect the boundary 28 of the road 26 or other stationary or moving objects in proximity to the sensor system 16. For example, as illustrated in FIG. 1, front sensors 16a in the sensor system 16 are preferably mounted externally on the front bumper and rear sensors 16b are mounted externally on the rear bumper of the host vehicle 10. However, the sensors in the sensor system 16 may be mounted on any suitable external portion of the host vehicle 10, including the front and rear quarter panels, the external mirrors or any combination of suitable areas.

The sensor system 16 is preferably configured to be capable of detecting a boundary 28 of a lane or a road 26 or other stationary or moving objects. However, the sensor system 16 can be any type of system desirable. For example, the front sensors 16a in the sensor system 16 can include a long-range radar device for detection in front of the host vehicle 10. The front radar sensor may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle 10. Thus, if desired, the front sensors 16a can include short-range radar devices to assist in monitoring the region in front of the host vehicle 10. The rear sensors 16b may include short-range radar devices to assist in monitoring objects behind the host vehicle 10. However, the sensors in the sensor system 16 can be disposed in any position of the host vehicle 10 and may include any type and/or combination of sensors to enable detection of a remote vehicle 10 in the threat zone. In addition, the sensor system 16 may include cameras 16c (e.g., mounted on the mirrors 35), radar sensors, photo sensors or any combination thereof. Although FIG. 1 illustrates four sensor sensors 16a and 16b and two cameras 16c, there can be as few or as many sensors as desirable or suitable.

Although the sensor system 16 can electronic detection devices that transmit either electronic electromagnetic waves (e.g., radar), the sensors can be any suitable sensors that, for example, take computer-processed images with a digital camera and analyzes the images or emit lasers, as is known in the art. The sensor system 16 may be capable of detecting at least the speed, direction, yaw, acceleration and distance of the host vehicle 10 relative to the boundary 28 of the road 26 or other stationary or moving objects. Further, the sensor system 16 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles 10. The sensor system 16 is in communication with the controller 14, and is capable of transmitting information to the controller 14.

Additionally, the sensor system 16 is capable of determining the distance from the left, right, front and rear of the vehicle 10 to a road boundary 28 or other stationary or moving objects. For example, the sensor system 16 is capable of detecting the road boundary 28, such as a wall, curb, lane marker, etc., or other stationary or moving objects to the left and right of the vehicle 10. Additionally, the sensor system 16 can include internal sensors capable of determining the steering wheel angle, the steering wheel angular speed and the vehicle speed along the road 26. Based on this information, the controller 14 is capable of calculating the relative position, relative speed, angle of the vehicle 10 relative to the road boundary 28, and estimated future position of the host vehicle 10.

The driver assistance system 12 may include a positioning system 18, such as a GPS 36. In an exemplary embodiment the vehicle 10 receives a GPS satellite signal. As is understood, the GPS 36 processes the GPS satellite signal to determine positional information (such as location, speed, acceleration, yaw, and direction, just to name a few) of the vehicle 10. As noted herein, the positioning system 18 is in communication with the controller 14, and is capable of transmitting such positional information regarding the vehicle 10 to the controller 14.

The positioning system 18 also can include a storage device 34 that stores map data 34a. Thus, in determining the position of the vehicle 10 using any of the herein described methods, devices or systems, the positioning of the vehicle 10 may be compared to the known data stored in the storage device 34. Thus, the driver assistance system 12 may accurately determine the location of the host vehicle 10 on an electronic map. The storage device 34 may also store any additional information including the current or predicted vehicle 10 position and any past vehicle 10 position or any other suitable information.

The warning indicator 20 may include warning lights and/or a warning audio output and is in communication with the controller 14. For example, the warning indicator 20 may include a visual display or light indicator that flashes or illuminates the instrument cluster on the instrument panel of the host vehicle 10, activates a heads-up display, is a visual readout in an information display unit, is an audible noise emitted from speaker, or any other suitable visual display or audio or sound indicator or combination thereof that notifies the driver or interior occupant of the host vehicle 10 that the distance between the vehicle 10 and the road boundary 28 is below a predetermined threshold or that the vehicle has deviated a predetermined distance from a preferred trajectory. Further, in an exemplary embodiment, the warning indicator 20 includes a visual indicator 38 or light on the housing of the external mirror 35, or any other suitable portion of the external mirror or portion of the vehicle 10.

As shown in FIG. 1, the feedback unit 22 may include tactile feedback generated by the haptic feedback 24 that can be a vibration actuator in the steering wheel, the driver seat, or any other suitable location within the host vehicle 10. That is, the feedback operation can include providing haptic feedback 24 to a portion of an interior of the vehicle 10 located proximate to the driver. For example, the feedback operation may be a feedback force within the steering system 42 that notifies the driver that the steering wheel 40 should be turned in a specific direction. Such a feedback operation does not necessarily need to alter the trajectory of the vehicle 10 but may be a minor turn of the steering wheel simply to notify the driver that a steering wheel operation is necessary. The feedback unit 22 can thus provide feedback to the driver based on a predetermined set of criteria. The feedback unit 22 is connected to the controller 14, which is programmed to operate the feedback unit 22 to warn the driver or control the vehicle 10. Preferably, the portion of the vehicle interior to which the haptic feedback is provided is proximal to the driver.

Figure 2:
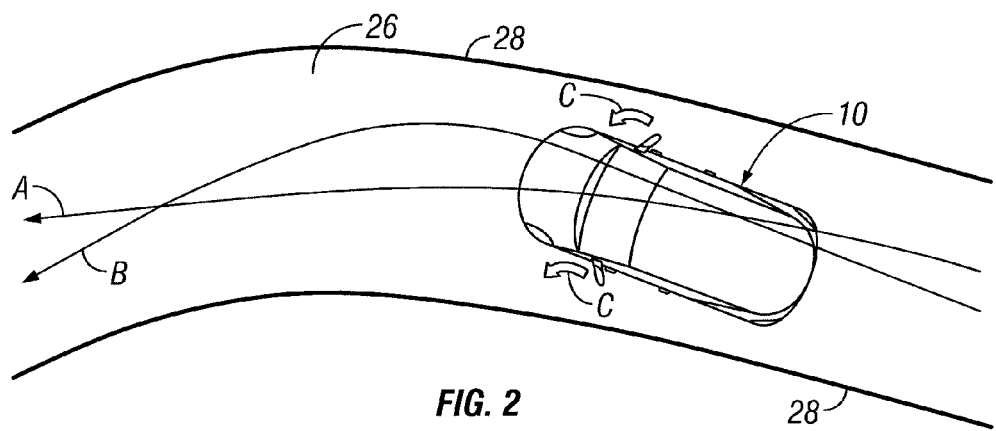
FIG. 2 is a schematic top view of first and second trajectories for a vehicle to follow while traveling along a road.
Figure 5:
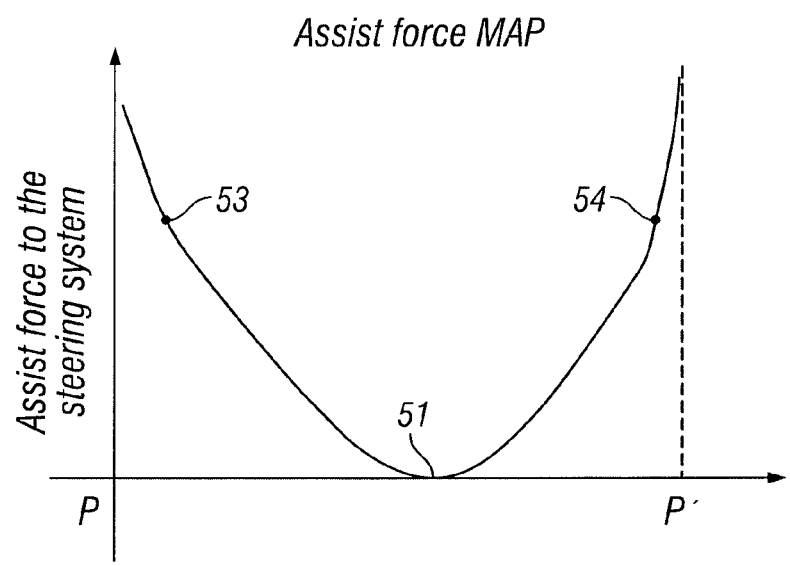
FIG. 5 is a graph illustrating an assist force applied to the vehicle based on a distance from the preferred trajectory for a single point along the trajectory.

Additionally, the feedback unit 22 may also be connected to the steering system 42 of the vehicle 10, such that the controller 14 can control the steering system 42 of the vehicle 10 based on a predetermined set of criteria. The feedback unit 22 can be connected to the steering wheel 40 or any other suitable portion of the steering system 42. That is, the feedback unit 22 can apply an assist force to a portion of the steering system 42 of the vehicle 10 to cause movement of the vehicle 10 away from the boundary 28 or toward the preferred trajectory. As shown in FIG. 2, the assist force (i.e., the assist torque) applied to the steering system of the vehicle 10 causes movement of the vehicle toward the preferred trajectory. As shown in FIG. 5, for example, application of the assist force to the steering system moves the vehicle 10 from a point 53 off the preferred trajectory to a point 51 on the trajectory.

In a first exemplary embodiment of the present invention, a method of assisting a driver of a vehicle includes identifying a road to be driven by the driver using a position determination unit. A parameter is selected to assist a driver of the vehicle in driving a segment of the road. The parameter includes information on the location of a boundary along the road and a preferred trajectory to be driven along the road. A controller determines whether a current trajectory of the vehicle while travelling the road is deviating from the preferred trajectory of the vehicle along the road. A feedback operation is provided to assist the driver in guiding the vehicle nearer to the preferred trajectory based on the selected parameter.

In a second exemplary embodiment of the present invention, a method of assisting a driver of a vehicle includes identifying a road to be driven by the driver using a position determination unit. A parameter is selected to assist a driver of the vehicle in driving a segment of the road. The parameter includes information on the location of a boundary along the road and a preferred trajectory to be driven along the road. A controller determines whether a driven trajectory of the vehicle while travelling the road is deviating from the preferred trajectory of the vehicle along the road. A feedback operation is provided while travelling the road to assist the driver in guiding the vehicle from the driven trajectory nearer to the preferred trajectory based on the selected parameter. The preferred trajectory is updated based on the driven trajectory of the vehicle along the road.

In a third exemplary embodiment of the present invention, a method of assisting a driver of a vehicle includes identifying a road to be driven by the driver using a position determination unit. A parameter is selected to assist a driver of the vehicle in driving a segment of the road. The parameter includes information on the location of a boundary along the road and a preferred trajectory to be driven along the road. The parameter has a series of values corresponding to a plurality of locations along the road. A controller determines whether a current trajectory of the vehicle while travelling the road is deviating from the preferred trajectory of the vehicle along the road. A feedback operation is provided to assist the driver in guiding the vehicle nearer to the preferred trajectory based on the selected parameter.

In a fourth exemplary embodiment of the present invention, a method of assisting a driver of a vehicle includes obtaining a feature of a road to be traveled by the vehicle with a sensor and/or a GPS system. A parameter is selected to assist a driver of the vehicle in driving a segment of the road based on the feature of the road. The parameter includes information on the location of a boundary along the road and a preferred trajectory to be driven along the road. A controller determines whether a current trajectory of the vehicle while travelling the road is deviating from the preferred trajectory of the vehicle along the road. A feedback operation is provided to assist the driver in guiding the vehicle nearer to the preferred trajectory based on the selected parameter.

Figure 3:
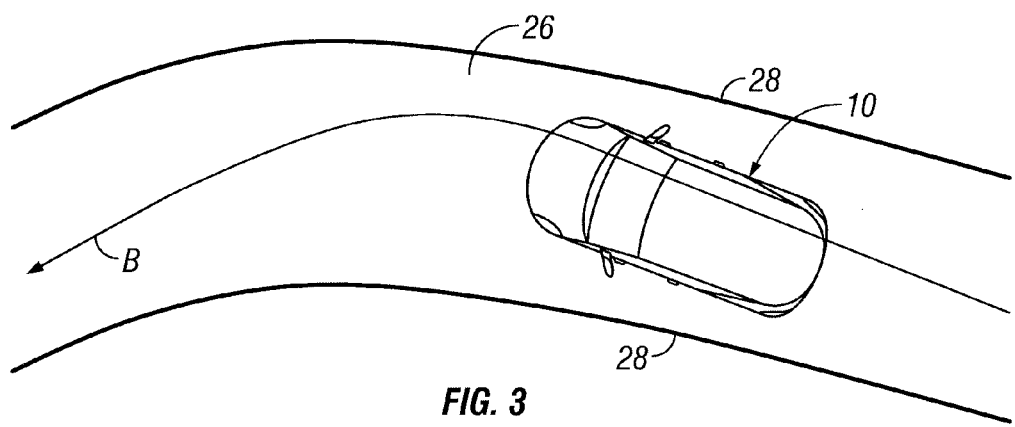
FIG. 3 is a schematic top view of a vehicle having the driver assistance system illustrated in FIG. 1 traveling the first trajectory of FIG. 2 along a road.
Figure 4:
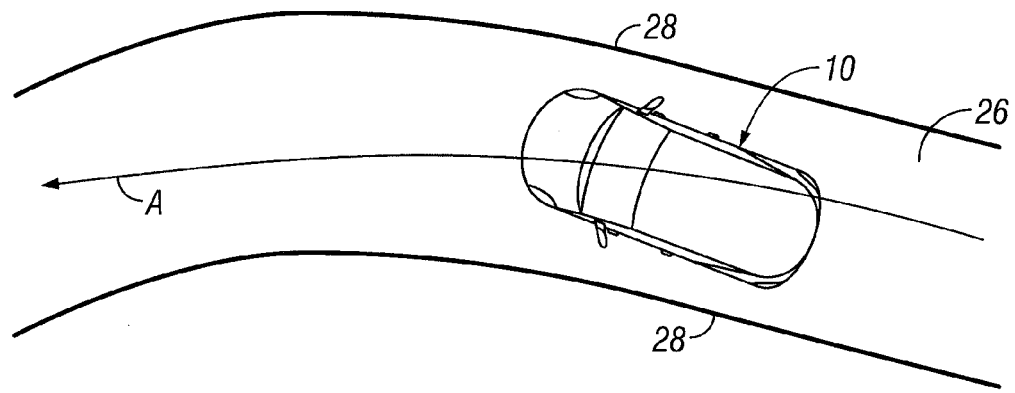
FIG. 4 is a schematic top view of a vehicle having the driver assistance system illustrated in FIG. 1 traveling the second trajectory of FIG. 2 along a road.

Turning to FIGS. 2 to 4, the host vehicle 10 is illustrated traveling along a road 26. As one of ordinary skill will understand, every driver may have a different comfort level as to how close the host vehicle 10 can approach a road boundary 28 (e.g., a curb, a wall, a lane marker, or other road boundary 28) when deciding a trajectory when traveling along the road 26. Therefore, the driver assistance system 12 is capable of notifying the driver or guiding the host vehicle 10 to a preferred trajectory, such as trajectory A or B in FIGS. 2-4. Moreover, the host vehicle 10 may need to change the trajectory depending on a passing vehicle 10, a pedestrian, a construction/work zone, a change in the road 26 (or lane) width, or any other possible scenario. Thus, it is clear that based on the identity of the driver or certain circumstances on the road 26, the host vehicle 10 is capable of adapting to a variety of acceptable trajectories between established road boundaries 28 along a road 26.

Figure 8:
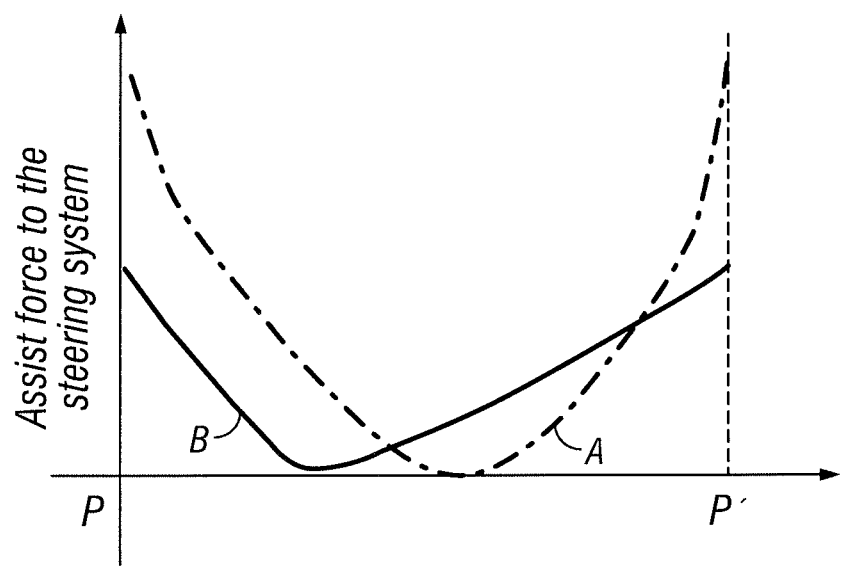
FIG. 8 is a graph illustrating the assist force applied to the vehicle based on the distance from the first and second trajectories at the position indicated in FIG. 7.

As shown in FIGS. 2-4, one driver may be comfortable having the host vehicle 10 approach a road boundary 28 at one distance, while another driver may be comfortable having the host vehicle 10 approach the road boundary 28 at a different distance such that both drivers have a different preferred trajectory along the road 26. That is, one driver (e.g., driver A in FIGS. 2 and 4) may not be comfortable approaching the road boundary 28 at the same distance as another driver (e.g., driver B in FIGS. 2 and 3). In this exemplary embodiment, driver B is generally more comfortable (i.e., aggressive) approaching the road boundary 28 at a closer distance than driver A (i.e., less aggressive). However, the distances may vary along the road 26, and while one driver may generally approach the road boundary 28 at less of a distance than another driver, the trajectories for each driver may change at any portion along the road 26. Thus, as shown in FIG. 8, different assistance force maps are applicable to the different trajectories A and B traveled by different drivers.

Thus, the controller 14 (FIG. 1) can adjust the timing of an assist force or warning dependent upon the preferences of the driver and specific circumstances of the road 26. In other words, the controller 14 may activate a tactile and/or visual warning from the warning indicator 20 in the compartment of the vehicle 10 and/or alter the direction and/or speed of the vehicle 10 based on the preferred trajectory between the road boundaries 28 for each vehicle 10 driver in each specific circumstance. As shown by the arrows C in FIG. 2, the controller 14 can alter the direction on the vehicle away from the road boundary 28 to guide the vehicle 10 nearer to the preferred trajectory. This alteration of trajectory can be accomplished by turning the wheels of the host vehicle 10.

Figure 9:
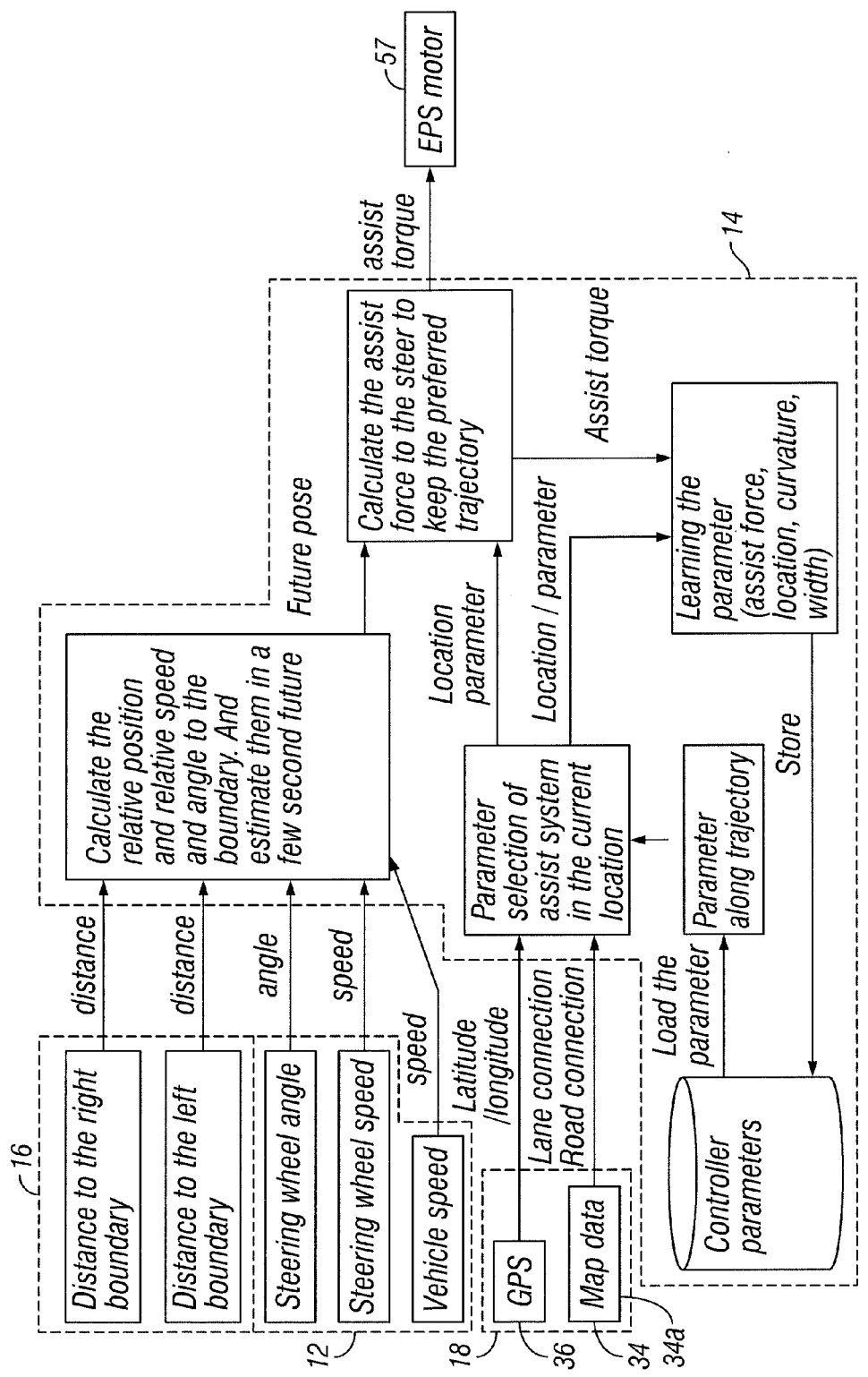
FIG. 9 is a schematic representation of the driver assistance system in accordance with an exemplary embodiment of the present invention.

Thus, as shown in FIG. 9, the sensor system 16 senses a road boundary 28 on the left and right sides of the vehicle 10 and transmits this information to the controller 14. The driver assistance system 12 can also determine the steering wheel angle, the steering wheel angular velocity and the vehicle 10 speed for each position along the road 26. This information is communicated to the controller 14. The controller 14 calculates the relative position, relative speed, angle of the vehicle 10 relative to the road boundary 28, and estimates the likely future position of the host vehicle 10 based on these variables.

The GPS 36 determines the latitude and longitude of the host vehicle 10 and, along with the map data 34a stored in the storage device 34, the location of the host vehicle 10 on a map (e.g., the road 26 and lane) is determined. Based on the determination of the host vehicle 10 location, a parameter is selected. That is, based on a condition, a parameter to assist a driver of the vehicle 10 when driving a segment of the road 26. The condition can be the identity of the driver, location of the host vehicle 10 relative to the road boundary 28, the speed of the vehicle 10 angle of the vehicle 10 relative to the road boundary 28, the estimated future position of the host vehicle 10 and/or a selection made by the driver. For example, in an exemplary embodiment, the controller 14 can then select a parameter based on the current location of the host vehicle 10 and the specific driver (i.e., identity of the driver).

Additionally, the GPS 36 and the sensor system 16 are capable of determining features of the road 26. For example, the GPS 36 and the sensor system 16 can determine the curvature of the road 26, the gradient of the road 26, the width of the road 26, and a presence of an object in the road 26. In an exemplary embodiment, the sensor system 16 can determine aspects of the road 26 based on the dimension and location and comparison to known stored information or map data. Thus, when selecting the parameter from a plurality of parameters, the controller 14 can compare the feature of the road 26 to a plurality of the stored feature values in the plurality of parameters, when the feature of the road 26 that corresponds to a predetermined stored feature of the plurality of stored features. The features of the road 26 can be weighted, such that one feature is weighted more than another feature. Moreover, the controller 14 can determine a correspondence between the feature on the road 26 and the stored feature using at least one static obstacle position along the road 26.

Figure 10:
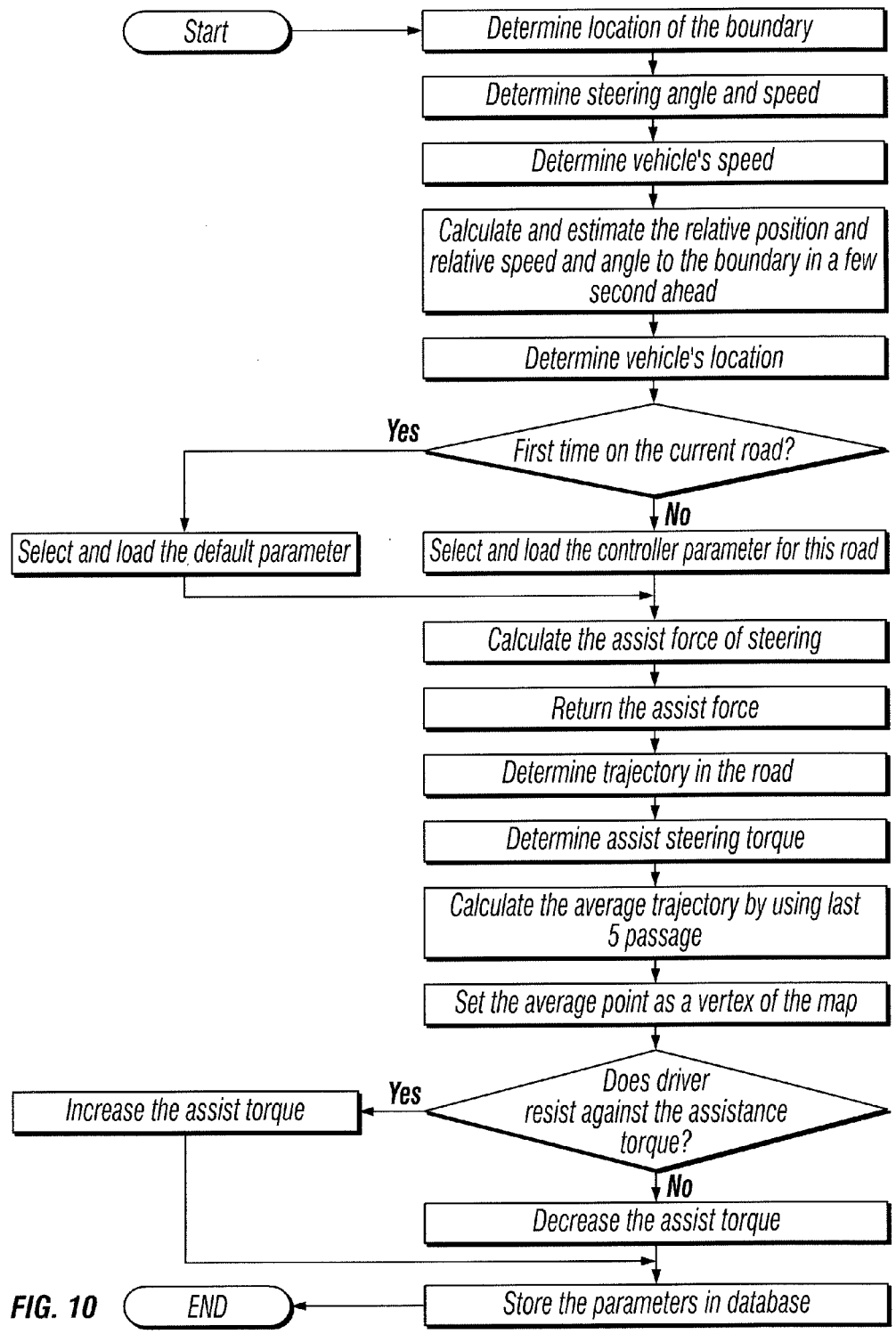
FIG. 10 is a flow chart illustrating the steps executed by the driver assistance system.
Figure 12:
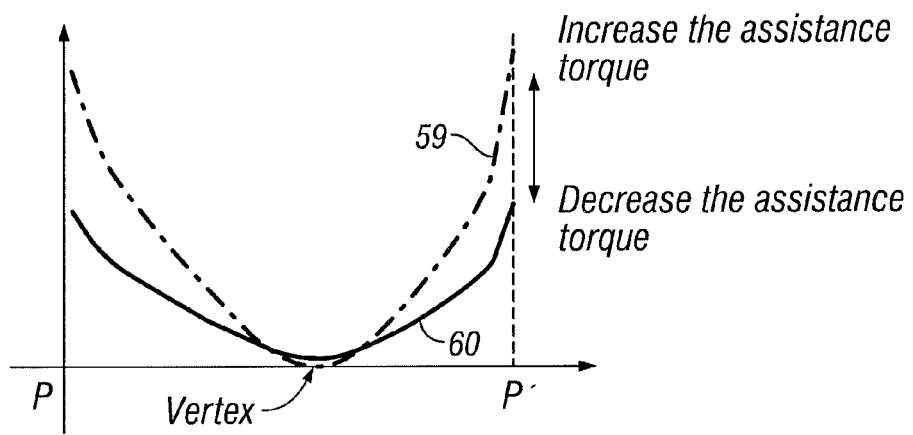
FIG. 12 is a graph illustrating the the assist force applied to the vehicle based on driver resistance to an assistance torque.
Figure 13:
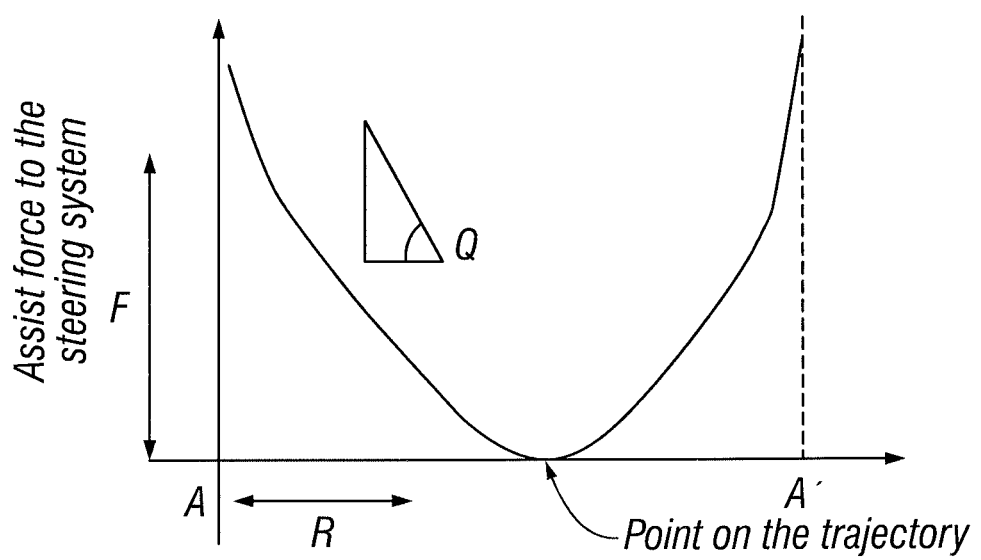
FIG. 13 is a graph illustrating the change in gradient of the assist force based on the distance from the boundary the maximum torque for a specific driver.

The parameter can be one or more of a distance threshold (FIGS. 14 and 15), an assist force threshold (FIG. 12), and a feedback force gradient (FIG. 13). In other words, the parameter can be a distance of the host vehicle 10 to the road boundary 28, the amount of torque for assist force to apply to the steering system and/or a predetermined increase or decrease in the assist force. As shown in FIGS. 10 and 12, the assistance force map changes based on the driver's resistance to the assistance torque. When the driver resists the assistance torque applied by the assistance force, the applied assistance torque is increased as indicated by the dashed line 59 in FIG. 12. When the driver does not resist the assistance torque applied by the assistance force, the applied assistance torque is decreased as indicated by the solid line 60 in FIG. 12.

The parameter can also be a particular segment of the road 26, the trajectory of the host vehicle 10 during a previous driving operation of the host vehicle 10 on the road 26, a latitude and longitude location of the host vehicle 10 during a previous driving operation of the host vehicle 10, distance information about the location of the road boundary 28 with respect to the road 26 based on a previous driving operation of the vehicle 10 on the road 26.

In an exemplary embodiment, the parameter can be a plurality of values corresponding to a plurality of boundary 28 locations along the segment of the road 26. For example, the plurality of values can be distance thresholds for a plurality of boundary 28 locations along the segment of the road 26, the latitude and longitude information for the plurality of boundary 28 locations along the segment of the road 26, weather information for the plurality of boundary 28 locations along the segment of the road 26, time of day information for the plurality of boundary 28 locations along the segment of the road 26, a position of at least one other vehicle 10 for the plurality of boundary 28 locations along the segment of the road 26, traffic information for the plurality of boundary 28 locations along the segment of the road 26, a position of at least one static object for the plurality of boundary 28 locations along the segment of the road 26, a width of a lane for the plurality of boundary 28 locations along the segment of the road 26, and a number of lanes for the plurality of boundary 28 locations along the segment of the road 26.

Additionally, if desired, the parameter can be a plurality of parameters. That is, the driver assistance system 12 can store a plurality of parameters in the storage device 32. The controller 14 can select one parameter or any combination of parameters from the plurality of parameters.

In an exemplary embodiment, the controller 14 calculates the assist torque for the assist force using at least one of the distance to the boundary 28, an angle of the host vehicle 10 relative to the boundary 28, a curvature of the road 26, and/or using estimated values for the distance of the vehicle 10 to the road boundary 28, estimated values for the distance of the vehicle to the preferred trajectory, angle of the vehicle 10 relative to the road boundary 28, angle of the vehicle 10 to the preferred trajectory, the estimated curvature of the road 26 at a predetermined period of time, estimated curvature of the preferred trajectory, a lateral distance of the vehicle across the road 26 (such as between points P and P' shown in FIG. 7), and/or the current trajectory of the vehicle. The estimated values can be based on the GPS and the sensor system 16 or based on real time information or stored information. The estimated values can be at a predetermined period of time in the future. Such estimates can be based on the current trajectory of the vehicle 10. The predetermined period of time in the future can be based on a speed of the driver's steering operation during previous driving maneuvers. For example, when the driver's steering operation is faster, the predetermined period of time is shorter. The average speed of the driver's steering operation is estimated based on previous driving maneuvers on the road 28 with or without application of the assist torque. Based on at least one of these factors, the controller 14 determines the amount of torque to apply to the steering wheel. For example, when the distance to the road boundary 28 is minimal, such as at points 53 and 54 of FIG. 5, the angle of the car relative to the boundary 28 is high and the curvature of the road 26 is high, the controller 14 may determine that a large assist force (i.e., large torque) needs to be applied to the steering system. In this situation, the controller 14 would then apply a large assist force to avoid the road boundary 28 and guide the vehicle 10 nearer to the preferred trajectory. For a point 51 at or near to the preferred trajectory, little or no assist force is applied to guide the vehicle to the preferred trajectory.

The parameters can be stored in one or more storage devices 32 in the driver assistance system 12. In an exemplary embodiment, the parameter can be manually selected by a user. For example, the driver may determine that driver assistance should be set such that the controller 14 will issue feedback or apply an assist force at a predetermined distance from a road boundary 28 or from the preferred trajectory. The driver may manually set and store parameters using the user inputs.

Moreover, the parameters can change (or be manually changed) for each driver along a road and for each road. That is, the driver may be comfortable at one distance from the road boundary 28 or from the preferred trajectory at a first portion of the road 26 and at another distance from the road boundary 28 or the preferred trajectory at a second portion of the road 26.

The parameters for each driver at each specific position along the road 26 once calculated for each new position are stored in the storage device 32. Thus, the system is capable of learning the acceptable driving parameters for each driver. That is, the preference of the assist force, the vehicle 10 location relative the boundary 28 and along the road 26, the curvature and width of the road 26 at each position along the road 26, for each driver can be stored and updated on a continuous basis.

Further, the parameters can be updated based on a driving operation of the vehicle 10 on the road 26 and/or based on a condition of the steering system. The parameters can be updated based on previous roads or on previous travel along the current road 26, with respect to the road 26 based on the previous driving operation of the vehicle 10 on the road 26, with weather information (e.g., sunny, cloudy, rainy) during the previous driving operation of the vehicle 10 on the road 26, with a time of day (e.g., day, night) during the previous driving operation of the vehicle 10 on the road 26, with a state of traffic state (e.g., sparse, congested) of the of the road 26 during the previous driving operation of the vehicle 10 on the road 26, with a position of other vehicle 10s on the road 26 during the previous driving operation of the vehicle 10 on the road 26, with a position of static objects proximal to the road 26 during the previous driving operation of the vehicle 10 on the road 26, with pedestrian status during the previous driving operation of the vehicle 10 on the road 26. The parameter map can also be updated based on a steering input supplied by the driver. For example, when the steering input is substantially similar to the assist torque, the values of the parameter map are changed to increase the assist torque.

For example, during inclement weather, at night, during high traffic situations, or other situations, a specific driver may prefer different distances from a road boundary 28 or from the preferred trajectory than at other situations. More specifically, a small distance from the road boundary 28 or from the preferred trajectory may be acceptable during the day, in clear weather with little traffic. However, a larger distance from the road boundary 28 or the preferred trajectory may be preferably at night, or in the rain with significant traffic.

When traveling along the current road 26, the characteristics of a previous road (similar to the current road 26) or the current road 26 previously travelled (once or a plurality of times) and the driver preferences along each road 26 can be used to update the parameters for the current road 26. Moreover, any of the factors discussed herein can be stored and updated for each driver. Thus, ensuring that the most preferably parameters for each driver are available for the driver assistance system 12.

Further, the parameters can be related to a particular road or a particular segment of the road and can be stored based on latitude and longitude of the road of segment of the road. Thus, the controller 14 can identify the particular segment based on latitude and longitude and select the parameter based on this information. Further, when the road has been travelled multiple times, the controller 14 can calculate the parameters based on a statistical calculation of traveling the segment of the road the plurality times previously. That is, the statistical calculation can determine the average or mean for each parameter to determine the most preferable environment for the driver. Thus, the preferred trajectory can be updated based on a plurality of previous trajectories traveled by the host vehicle 10 along the road 28.

Figure 11:
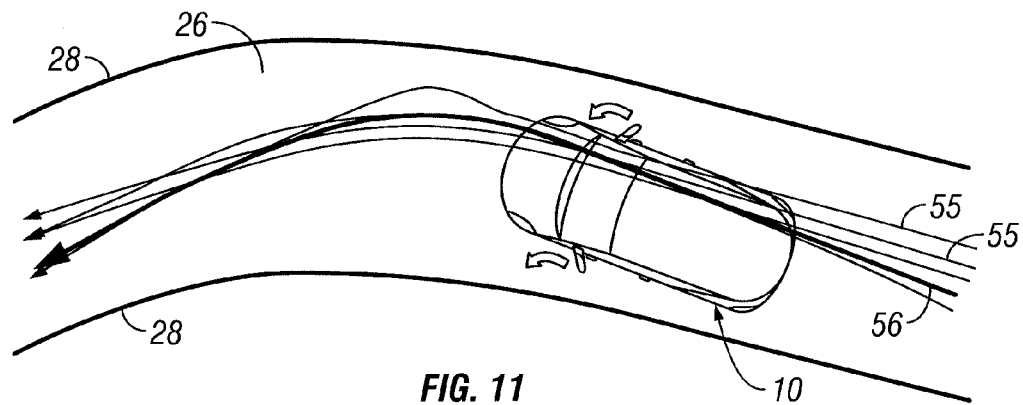
FIG. 11 is a schematic top view of the driver assistance system with an average trajectory based on a plurality of previous trajectories along the road.
Figure 14:
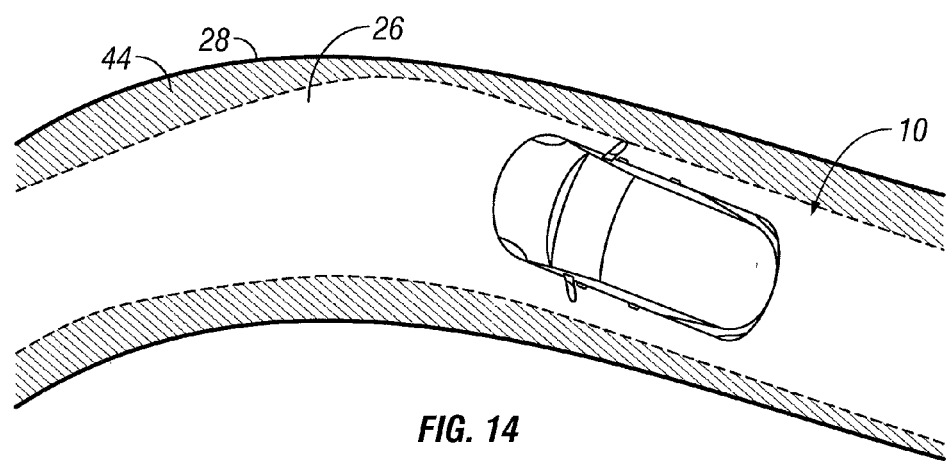
FIG. 14 is a schematic top view of a vehicle having the driver assistance system illustrated in FIG. 1 with a representation of a first calculated threshold distance between the vehicle and the road boundary.
Figure 15:
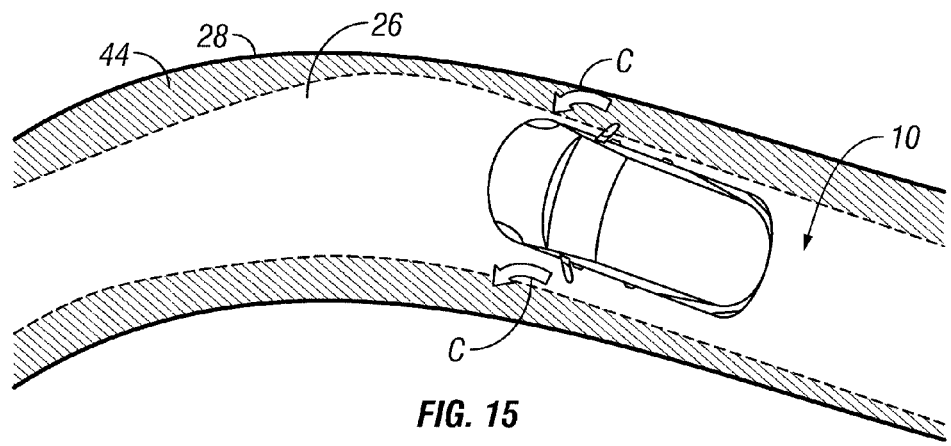
FIG. 15 a schematic top view of a vehicle having the driver assistance system illustrated in FIG. 1 with a representation of a second calculated threshold distance and a representation of the assist force applied to the vehicle.

Accordingly, the parameters can be updated based on previous operation of the vehicle 10, such as during a previous driving operation of the vehicle on the road 26. The parameters can be updated based on a statistical calculation (average, standard deviation or other suitable method) of a plurality of previous driving operations on the road. For example, as shown in FIG. 11, the average trajectory 56 is calculated based on the previous trajectories 55 of the vehicle 10 along the road 26. Accordingly, the parameters can include the trajectory 55 of the vehicle 10 during a previous operation of the vehicle 10 along the road 26. The series of parameter values can include a distance threshold such that when the distance of the vehicle 10 to the boundary 28 is less than a distance threshold, the parameters indicate to apply the feedback operation. As shown in FIG. 14, the vehicle 10 is outside the distance threshold 44 such that the feedback operation is not applied. As shown in FIG. 15, the vehicle 10 is within the distance threshold 44 to the boundary 28 such that the feedback operation is applied, thereby applying a torque assist indicated by arrows C to the steering system of the vehicle 10. The series of parameter values can also include latitude and longitude information, curvature information, weather information, time of day information, traffic information, information regarding positions of other vehicles, positions of static objects, presence of pedestrians, width of the road, number of lanes in the road, and/or length of the road for the plurality of boundary locations along the road 26.

Thus, as the host vehicle 10 approaches a road boundary 28, the road boundary 28 is sensed by the sensor system 16, and the controller 14 determines whether the vehicle 10 is approaching the road boundary 28 and the location of the road boundary 28 relative to the host vehicle 10. The controller 14 determines this aspect based on a trajectory of the vehicle 10, the location of the host vehicle 10 relative to the road boundary 28, or in any other suitable manner.

In an exemplary embodiment, as the host vehicle 10 approaches the road boundary 28, the controller 14 determines that, based on the location of the host vehicle 10, driver preferences, and/or a feature of the road 26, a feedback operation to assist the driver in guiding the vehicle to the preferred trajectory based on the selected parameter is necessary. The feature of the road 26 can be any desirable feature, such as one of or a plurality of the curvature of the road 26, the gradient of the road 26, the width of the road 26, and a presence of an object in the road 26. Thus, when selecting the parameter from a plurality of parameters, the controller 14 can compare the feature of the road 26 to a plurality of the stored feature values in the plurality of parameters. When the feature of the road 26 corresponds to a predetermined stored feature of the plurality of stored features, the controller 14 selects the appropriate parameter. The features of the road 26 can be weighted, such that one feature is weighted more than another feature. Moreover, the controller 14 can determine a correspondence between the feature on the road 26 and the stored feature using at least one static obstacle position along the road 26.

In an exemplary embodiment, as discussed herein, the feedback operation is an assist force that is applied. That is, as the host vehicle 10 is approaching the road boundary 28 or deviating from the preferred trajectory such that the host vehicle 10 has surpassed a distance threshold, the controller 14 determines that a feedback operation should be applied to assist the driver of the vehicle 10. As shown in FIG. 5, the greater the distance of the vehicle form the preferred trajectory, the greater the assist force applied to the steering system.

In an exemplary embodiment, the controller 14 calculates an assist force as the feedback operation. That is, the controller 14 determines, based on the location of the host vehicle 10, the speed of the host vehicle 10, the trajectory of the host vehicle 10, and/or the identity of the driver, that an assist force is necessary and the preferred torque of the assist force. The controller 14 then applies the assist force, using an electric power steering (EPS) motor 57 (FIG. 9) to move the vehicle 10 wheels (and the steering wheel, if desired) to move the vehicle 10 away from the road boundary 28 or nearer to the preferred trajectory. In other words, in this exemplary embodiment, the feedback operation includes applying an assist force when a distance of the host vehicle 10 to the road boundary 28 or from the preferred trajectory is less than a distance threshold (such as points 53 and 54 of FIG. 5). Once the vehicle 10 is farther from the road boundary 28 or nearer the preferred trajectory than the distance threshold, the controller 14 terminates the assist force.

Alternatively, the controller 14 can cause a warning to be communicated to the driver. The warning can be a tactile warning through the steering wheel, the driver's seat or in any other suitable manner. Moreover, the warning can be a visual warning through a light or other device in the instrument panel or other portion of the vehicle 10, or the warning may be an auditory warning. The warning may be alone or in addition to the assist force applied by the EPS and can be any combination of tactile, visual and auditory.

As shown in FIG. 9, the calculation of the assist force is also used in learning the specific preferences of a parameter for a driver. This information is stored in a storage device 32 for later use for a specific driver.

FIG. 10 illustrates one procedure for applying the driver assistance system 12. Initially, the sensor system 16 determines the location of the road boundary 28 relative to the host vehicle 10. This information is transmitted to the controller 14. The steering wheel angle and rotational speed are then determined, along with the speed of the vehicle 10. The relative position and relative speed and angle to the road boundary 28 a few seconds ahead are calculated and/or estimated to determine the host vehicle 10's location relative to the road boundary 28. The controller 14 then determines whether it is the first time the vehicle 10 has been on the current road 26. When it is the first time the vehicle 10 has been on the road 26, the controller 14 selects and loads a default parameter, such as based on a road 26 having similar characteristics. When the vehicle 10 has previously driven the road 26, i.e., not the vehicle's first time on the road 26, the controller 14 selects and loads a parameter map.

Further, as discussed above, when it is the first time the host vehicle 10 is traveling along the road 26, the characteristics of a previous road (similar to the current road 26) and the driver preferences along the previous road can be used to update the parameter for the current road. In this exemplary embodiment, the parameter is selected or loaded prior to or while traveling along the current road. Accordingly, after traveling a first road, the parameters based on the vehicle 10 traveling the first road are updated. The updated parameters can then be selected before traveling a second road. Additionally, the updated parameters can then be selected before traveling the first road again.

The preferred trajectory along the road 26 can be based on parameter values related to the driven trajectory obtained from traveling the road a plurality of times previously. The parameter values can be based on a statistical calculation from having traveled the road 26 a plurality of times previously. The parameters related to a particular road 26 can be stored with the latitude and longitude of the particular road 26.

As shown in FIG. 9, a determination is made as to whether the vehicle has traveled the road 26 before, and the then selecting and loading the parameters associated with the previously traveled road. The parameters can include a driven trajectory 55 during a previous driving operation of the road 26, as shown in FIG. 11. The parameters can also include the latitude and longitude of the vehicle 10 and/or distance information regarding the location of the boundary 28 with respect to the road 26 during the previous driving operation. The parameters can be updated with curvature information about the boundary location with respect to the road, state of the weather information, the time of day, the state of traffic, the position of other vehicles on the road, the position of static objects proximal to the road and/or the presence of pedestrians during the previous driving operation of the vehicle 10 on the road 26.

When the vehicle 10 has not traveled the particular road 26 previously, default parameters can be selected and loaded, as shown in FIG. 10.

The controller 14 then calibrates the assist force for the particular segment or portion of the road 26, and determines the trajectory of the host vehicle 10. The controller 14 can then determine the assist force necessary to move the vehicle 10 away from the boundary 28 or neared the preferred trajectory without making the vehicle 10 driver and/or other occupants uncomfortable.

Moreover, the controller 14 can determine the sequence of the driver's steering force against the assist force and adjust the assist force parameter in the storage device 32 using this information. The new assist force, along with the parameters used to calculate the assist force can be stored in the storage device 32 for further use on the road at other times.

Then, as discussed above, the controller 14 can apply a feedback operation to assist the driver in avoiding the road boundary 28, to guide the vehicle nearer the preferred trajectory, or to merely make the driver comfortable. The feedback operation can be the assist force or merely a warning to the driver.

Figure 6:
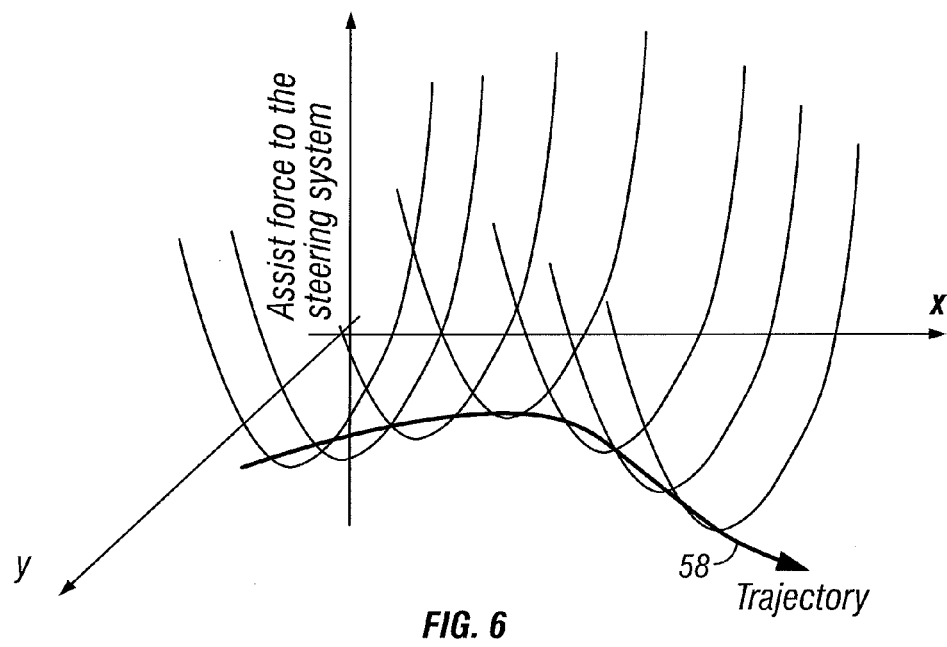
FIG. 6 is a graph illustrating the assist force applied to the vehicle based on a distance from the preferred trajectory for a plurality of points along the trajectory.

As shown in FIG. 6, the assist force can vary along the road 26. The parameters associated with the plurality of positions along the preferred trajectory 58 can be stored with the particular position on the trajectory 58.

Figure 7:
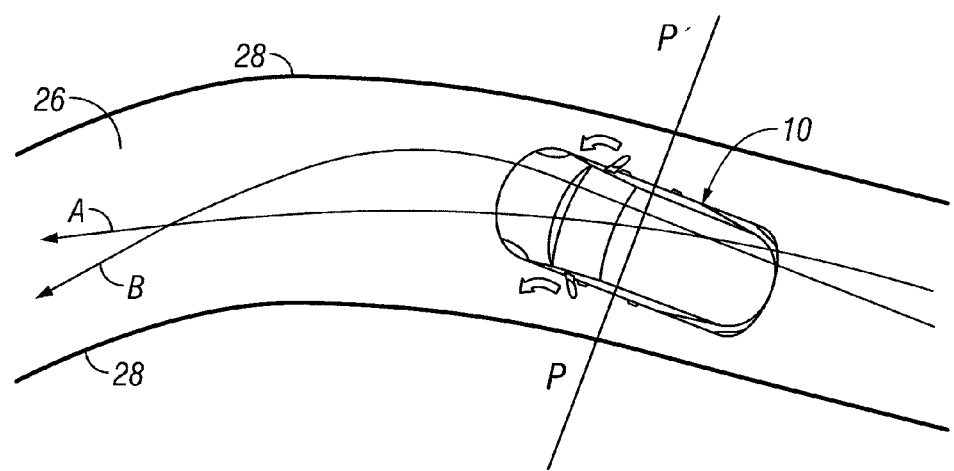
FIG. 7 is a schematic top view of first and second trajectories for a vehicle along a road and indicating a position along the trajectories.

As shown in FIGS. 7 and 8, for example, trajectory B indicates a more aggressive trajectory along the road 26, and A indicates a less aggressive trajectory along the road 26. P indicates the host vehicle 10 position on the left side of the road 26, and P' indicates the host vehicle 10 position on the right side of the road 26. Thus, for predetermined positions along the road 26 the preferred trajectory can vary for each driver. As shown in FIG. 8, different assistance force maps are associated with the different trajectories. Accordingly, based on at least one condition of a plurality of conditions (e.g., the distance along the road 26, the driver, the speed of the vehicle 10, the trajectory of the vehicle 10), the preferred trajectory can be adjusted. Moreover, as the preferred trajectory is adjusted the assist force can be adjusted by the controller 14. That is, the assist force may be reduced for certain locations along a road 26 or at certain vehicle 10 speeds.

Moreover, as shown in FIGS. 6 and 8, as the distance of the host vehicle 10 from the preferred trajectory increases (i.e., closer to points P and P'), the assist force increases. That is, when the host vehicle 10 is significantly beyond the preferred trajectory, the controller 14 can apply a significant assist force to the steering wheel. However, when the host vehicle 10 is at or near the preferred trajectory, the controller 14 can apply a slight or small assist force. Thus, the trajectory of the host vehicle 10 is not significantly altered when significant alteration is not necessary.

The assist force can also be applied based on a previous user operation. That is, the assist force can be calculated using a predetermined period of time of a speed of a steering operation during previous driving maneuvers. For example, the time the steering is turned and angle that the steering wheel is turned in previous driving operations can be used to determine the assist force. When the speed of the steering operation during previous driving maneuvers increases, a predetermined period of time of applying the assist force is decreased. Additionally, the average speed of the driver operation (i.e., turn of the steering wheel) can be estimated by usual driving characteristics when the driver drives on a road 26 that is similar to the current road 26 with or without the assist force. Thus, the controller 14 can apply the assist force based on previous driver characteristics.

Further, as discussed above, based on the preferred trajectory and the driver preference, the controller 14 may learn and adjust for each driver. That is, the preference of the assist force, the vehicle 10 location relative the boundary 28 and along the road 26, the curvature of the road 26 at each position along the road 26, for each driver can be stored and updated on a continuous basis.

As shown in FIG. 9, the selected parameter map can include, for example, the location of a preferred trajectory along the road 26 with respect to the boundary 28 and indicates when to apply a feedback force. The parameter map can further include a feedback force gradient to determine the amount of feedback force to be applied. When the driver assistance system 12 indicates to apply the feedback force, such feedback force is calculated according to the feedback force gradient. As illustrated in FIG. 13, the gradient Q of the assist force to the steering system can be adjusted for each specific driver of the host vehicle 10 or based on a condition of the host vehicle 10. That is, the controller 14 sets the maximum assist torque for each driver based on the known characteristics of the driver and the threshold distance from the road boundary 28. As specifically illustrated in FIG. 13, the gradient of the assist torque can be changed or modified the closer the host vehicle 10 is to the road boundary 28 (i.e., the position R of the host vehicle 10 relative to the preferred trajectory) and the maximum amount of assist force F to be delivered to the steering system based on individual driver preference.

Thus, as will be understood, the driver assistance system 12 as described herein will provide feedback to the driver based on a distance from the preferred trajectory, the distance to the boundary 28 and a driver's individual skill and preference, and other desired parameters or factors. Accordingly, the driver experience and comfort level while driver along roads that may have significant traffic, narrow lanes or obstacles along the side of the road 26, and maintaining a preferred trajectory along the road will be improved.

The storage devices and GPS are conventional components that are well known in the art. Since storage devices and GPS are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "front", "rear", "left", and "right" as well as any other similar directional terms refer to those directions of a vehicle equipped with the Method and System of Assisting a Driver of a Vehicle. Accordingly, these terms, as utilized to describe the present invention should be interpreted relative to a vehicle equipped with the Method and System of Assisting a Driver of a Vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of assisting a driver of a vehicle, the method comprising the steps of:

identifying a road to be driven by the driver using a position determination unit;

selecting a parameter to assist a driver of the vehicle in driving a segment of the road, the parameter including information on a location of a boundary along the road and a location of a preferred trajectory to be driven along the road with respect to the boundary and indicates when to apply a feedback force, the parameter further including a feedback force gradient for determining the amount of the feedback force to be applied, the feedback force being calculated according to the feedback force gradient;

determining, via a controller in communication with a sensor system, whether a current trajectory of the vehicle while travelling the road is deviating from the preferred trajectory of the vehicle along the road; and providing a feedback operation to assist the driver in guiding the vehicle nearer to the preferred trajectory based on the selected parameter, the feedback operation including the application of the feedback force.

2. The method of claim 1, wherein
the step of providing the feedback operation to the driver includes providing haptic feedback to a portion of the vehicle interior located proximal to the driver.

3. The method of claim 1, wherein
the step of providing the feedback operation to the driver includes the feedback force applying an assist torque on a portion of a steering system of the vehicle to cause movement of the vehicle toward the preferred trajectory.

4. The method of claim 3, wherein the feedback force gradient is adjusted using at least one of the group consisting of a lateral distance of the vehicle across the road, the current trajectory of the vehicle, and curvature of the road.

5. The method of claim 1, wherein
the parameter is selected based on the condition of an identity of the driver.

6. The method of claim 1, wherein
the parameter is selected based on the condition of a selection made by the driver.

7. The method of claim 1, wherein
the feedback force gradient is adjusted based on an identity of the driver.

8. The method of claim 7, wherein
when the average speed of the driver's steering operation is faster, the predetermined period of time is shorter.

9. The method of claim 8, wherein
the preferred trajectory is based on a desired aggressiveness selected by the driver.

10. The method of claim 7, wherein
the average speed of the driver's steering operation is estimated based on previous driving maneuvers on the road with or without the assist torque applied.

11. The method of claim 7, wherein
the preferred trajectory is based on a desired aggressiveness selected by the driver.

12. A method of assisting a driver of a vehicle, the method comprising the steps of:
identifying a road to be driven by the driver using a position determination unit;
selecting a parameter to assist a driver of the vehicle in driving a segment of the road, the parameter including information on the location of a boundary along the road and a preferred trajectory to be driven along the road;
determining, via a controller in communication with a sensor system, whether a current trajectory of the vehicle while travelling the road is deviating from the preferred trajectory of the vehicle along the road; and
applying an assist torque on a portion of a steering system to move the vehicle toward the preferred trajectory based on the selected parameter,
the assist torque being calculated using estimated values for a distance of the vehicle to the preferred trajectory, an angle to the preferred trajectory, and a curvature of the preferred trajectory at a predetermined period of time in the future, and
the predetermined period of time in the future being based on a speed of the driver's steering operation during previous driving maneuvers.

13. A method of assisting a driver of a vehicle, the method comprising the steps of:
identifying a road to be driven by the driver using a position determination unit;
selecting a parameter to assist a driver of the vehicle in driving a segment of the road, the parameter including information on the location of a boundary along the road and a preferred trajectory to be driven along the road;
determining, via a controller in communication with a sensor system, whether a current trajectory of the vehicle while travelling the road is deviating from the preferred trajectory of the vehicle along the road; and
providing a feedback operation to assist the driver in guiding the vehicle nearer to the preferred trajectory based on the selected parameter,
the preferred trajectory being updated based on a plurality of previous trajectories the vehicle travelled along the road segment.

14. The method of claim 3, wherein
the feedback force gradient is adjusted using estimated values for a distance of the vehicle to the preferred trajectory, an angle to the preferred trajectory, and a curvature of the preferred trajectory at a predetermined period of time in the future.

15. The method of claim 14, wherein
an estimated value of the distance of the vehicle to the boundary, an estimated value of the angle to the boundary, and an estimated value of the curvature of the road are calculated based on the vehicle's current trajectory.

16. The method of claim 3, wherein
the feedback force is modified based on a resistance of the drive to the applied assist torque.

17. The method of claim 1, wherein
the preferred trajectory is based on a desired aggressiveness selected by the driver.

18. The method of claim 1, wherein
the parameter is updated based on a driven trajectory along the road segment during a previous driving operation.

19. The method of claim 1, wherein
the boundary is a wall or a curb proximal to the road.

20. The method of claim 1, wherein
the boundary is a lane marker on the road.

* * * * *